Patented May 20, 1952

2,597,159

UNITED STATES PATENT OFFICE 2,597,159

CONDENSATION OF AROMATIC HYDROCARBONS WITH FORMALDEHYDE CATALYZED BY FORMIC ACID

Paul D. May, Galveston, and Robert J. Lee, Lamarque, Tex., assignors to Pan American Refining Corporation, Texas City, Tex., a corporation of Delaware No Drawing. Application April 27, 1950,
Serial No. 158,596

12 Claims. (Cl. 260—668)

This invention relates to catalytic Baeyer-type condensation processes and, more particularly, to chemical condensation reactions between aromatic hydrocarbons and formaldehyde in the presence of a novel catalyst and solvent, namely, formic acid or concentrated aqueous solutions of formic acid.

The specific field with which the present invention is particularly concerned is the production of diaryl methanes or polyarylmethylene compounds having desirable properties, which permit of their extensive application in industry. Numerous attempts have been made to commercialize this specific field without particular success, principally, it is believed, because of the difficulties encountered in developing suitable catalysts for the desired condensation reactions. Numerous catalysts, some of which have been failures and some successes in certain respects, have been described in U. S. Patent 2,216,941 of A. H. Gleason and in a publication in Ind. Eng. Chem. 32, 306–7 (1940) by S. C. Fulton and A. H. Gleason.

Experience in the art of producing condensation products by the reaction of formaldehyde with aromatic hydrocarbons indicates that the idealized catalyst should have about the following properties:

(1) It should be cheap and readily available;
(2) It should not be readily inhibited, complexed or destroyed by the water formed during the condensation reaction;
(3) It should not form emulsions with the reaction mixture which are difficult to separate;
(4) It should be readily separable from the reaction mixture and should be capable of cheap regeneration and continued re-use;
(5) A high yield of condensation product should be produced per unit weight of catalyst;
(6) The catalyst should lead to the production of light-colored products.

While a number of the catalysts known to the prior art have certain desirable properties, to our knowledge no prior catalyst has all of the above enumerated qualities, so that considerable incentive for further research into catalysts for Baeyer-type condensation reactions exists.

One object of this invention is to provide a novel catalyst for Baeyer-type condensation reactions of aromatic hydrocarbons with formaldehyde. Another object of this invention is to provide a new catalytic process for the manufacture of diaryl methane compounds. An additional object is to provide a new catalytic process for the manufacture of resinous materials by effecting the condensation of aromatic hydrocarbons, particularly methyl-substituted aromatic hydrocarbons, with formaldehyde or materials yielding the same. Another object of the invention is to produce lighter colored resins than have been obtainable by the processes heretofore available, for example, the $ZnCl_2$-acetic acid process. These and other objects of our invention will be apparent from the following description thereof.

We have discovered that formic acid, or aqueous solutions thereof having a concentration of at least about 70 weight percent formic acid, unexpectedly functions as a catalyst which induces the chemical condensation of various aromatic hydrocarbons with formaldehyde. The catalytic utility of formic acid was surprising, since acetic acid and higher fatty acids do not manifest catalytic activity in the reactions under consideration here, but function merely as solvents for the reactants. Experimental data submitted hereinafter show that acetic acid does not function as a catalyst and this is further borne out by the publication of Fulton and Gleason (supra) who point out that acetic acid was not a catalyst even in the presence of anhydrous hydrogen chloride, which would obviously increase its acidity considerably. Formic acid (75–90 weight percent) functions as a partial solvent for the reactants since it has been shown that substantially the same resin yields are obtained either with or without stirring of the reaction mixture under refluxing conditions. In addition, as will be apparent from the specific examples of the invention hereinafter supplied, formic acid can be employed without encountering emulsion difficulties, its use leads to desirable light-colored reaction products, it has a long catalyst life, and it can be readily separated from the reaction mixture and re-used. These and other desirable properties of the formic acid catalyst of the present invention will be apparent from a study of the specific examples which follow.

Briefly, in accordance with this invention, an aromatic hydrocarbon having at least one, and preferably at least two, unsubstituted nuclear carbon atoms is heated with formaldehyde or a polymer thereof, such as paraformaldehyde, and formic acid having a concentration of at least about 70 weight percent, preferably at least 77 weight percent, which serves as the catalyst and, when employed in sufficiently large proportions, also serves as a solvent for the reactants. Usually, the reactants and catalyst are refluxed at about atmospheric pressure and the formic acid is employed in amounts in excess of the other reactants. As the reaction proceeds, the reaction product, which is insoluble in the formic acid, dissolves in the hydrocarbon phase, which can be separated after the reaction by decantation from the formic acid solution of unconverted reactants. In order to facilitate decantation, or equivalent separations such as centrifuging, and further handling, the condensation product may be taken up in a hydrocarbon solvent, e. g. in a saturated hydrocarbon such as pentane or hexane or in an aromatic hydrocarbon solvent such as benzene. The reflux temperature of the reaction mixture ordinarily lies between the boiling point of formic acid, which is about 100° C. in the pure state, and the boiling point of the water-formic acid azeotrope, which is about 107° C. at one atmosphere. The water-formic acid azeotrope contains 77.5 weight percent of formic acid. It will be apparent that the reaction may be effected under superatmospheric pressure in order to raise the reaction temperature and thus to shorten the required reaction period and/or produce higher molecular weight condensation products. It will also be apparent that an auxiliary solvent may be employed with formic acid, for example, glacial acetic acid, although, in general, this is not necessary or desirable even though the reactants are not completely mutually soluble.

By the practice of specific embodiments of the present invention, for example, the condensation of hydroformer bottoms fractions comprising principally mono- and di-methylnaphthalenes with paraformaldehyde in the presence of concentrated formic acid, we have produced soft, low-melting, light-colored resinous materials of predominantly hydrocarbon constitution, although infra-red spectrum analysis indicates the possible presence of some aldehyde and ether groups also in the products. Infra-red spectrum analysis of the foregoing products reveals no hydroxyl or carboxyl groups. We have, thus, prepared materials having softening points (ring and ball) between about 50 and about 100° C., although it is apparent that by suitable adjustment and correlation of the reaction conditions it would be possible to vary the softening point or molecular weight of the product within limits. The foregoing products are in general readily soluble in hydrocarbon solvents, e. g. saturated hydrocarbons such as n-octane, petroleum ether and the like or in aromatic hydrocarbon solvents such as benzene, toluene, xylenes, aromatic naphthas and the like. Co-reaction of methylnaphthalene and phenol with formaldehyde in the presence of formic acid yields much higher molecular weight, infusible reaction products. From xylenes, the practice of the present invention has led to the production of light-colored (Gardner 1-2) viscous, partially distillable resinous materials of predominantly hydrocarbon composition. Some of the latter products are apparently isomeric mixtures of dixylyl methanes and some are higher molecular weight condensation products.

Suitable hydrocarbon feed stocks for the present invention are aromatic hydrocarbons containing at least one unsubstituted nuclear carbon atom, for a single condensation of 2 mols of aromatic hydrocarbons with one mol of formaldehyde, but at least 2 unsubstituted nuclear carbon atoms in the molecule if it is desired to effect multiple condensations of formaldehyde and the aromatic hydrocarbon. Unsubstituted aromatic hydrocarbons such as naphthalene are ordinarily less reactive than methyl-substituted aromatic hydrocarbons, and of the latter, highly reactive and suitable feed stocks contain at least 2 methyl substituents and at least 2 unsubstituted nuclear carbon atoms per molecule. The above statements with regard to feed stocks are intended in the nature of generalizations rather than invariable rules. Thus, as will be shown hereinafter, 1-methylnaphthalene reacts readily and produces high quality resins easily upon condensation with paraformaldehyde in the presence of a formic acid catalyst. In general, we prefer to employ as feed stocks, methyl-substituted aromatic hydrocarbons boiling between about 110° C. or 140° C. and about 300° C. Specifically, aromatic hydrocarbon charging stocks may comprise toluene, the xylenes in the form of isomer concentrates or mixtures of isomers as produced commercially, cumene, ethyltoluenes, ethylxylenes, mesitylene, methylnaphthalenes, dimethylnaphthalenes, trimethylnaphthalenes, propylnaphthalenes, methyl propylnaphthalenes, butylnaphthalenes, methyl butylnaphthalenes, tetralin, methyltetralins, anthracene, methylanthracene, phenanthrene, methylphenanthrene and the like.

The aromatic hydrocarbon charging stocks need not necessarily be employed in the pure condition, but may be employed in the form of commercially produced fractions, bearing in mind that certain impurities such as sulfur compounds, oxygenated compounds and highly colored impurities should be removed by pretreatment before effecting the condensation reaction if the production of light-colored products is desired. Unconverted aromatic hydrocarbon charging stock recovered from the operation of the process of the present invention is an excellent charging stock for further passes through the process, for we have noted that colored and other impurities tend to concentrate in the resinous product, leaving the unconverted charging stock in a clear colorless condition. We have also noted that lighter colored resins are often obtained when the unconverted feed stock from one run is used as feed stock for a second run. Excellent charge stocks may also be obtained by sulfuric acid and clay treatment.

A useful feed stock is a fraction of hydroformer bottoms comprising substantial proportions of methylnaphthalenes. Hydroformer bottoms have previously been described, for example, in R. F. Marschner, U. S. Patent 2,335,596, patented November 30, 1943 and in F. T. Wadsworth and R. J.

Lee, U. S. Patent 2,462,792, patented February 22, 1949. A heart fraction of total hydroformer bottoms, boiling between about 235 or 240° C. and about 290° C., is a hydrocarbon mixture comprising principally mono- and di-methylnaphthalenes containing less than about 10 volume percent of paraffins and naphthenes and small amounts of tri- and tetra-methylnaphthalenes which are probably present in the 275-290° C. boiling range component of the larger fraction. Monocyclic aromatics and tetralins are present in amounts of about 10 to 20 volume percent. The approximate ratio of di-methylnaphthalenes to mono-methylnaphthalenes is 2. Various dimethylnaphthalenes have been identified in fractions of hydroformer bottoms, including 1,5-; 1,6-; 2,6-dimethylnaphthalenes. Appreciable, although relatively minor variations in the composition of hydroformer bottoms fractions can be attributed to variations in catalysts and details of the hydroforming process operation. Other sources of alkyl naphthalene charging stocks, especially methylnaphthalenes, suitable for employment in the process of the present invention are cycle stocks from cracking operations, particularly catalytic cracking, certain solvent extracts, hydrogenation products, etc., as disclosed in the above-mentioned U. S. patents of Marschner and Wadsworth et al.

Temperatures between about 10 and about 130° C. can be employed in the practice of the present invention, although we prefer to use temperatures in the range of about 50° C. to about 110° C., and have often employed temperatures between about 100 and about 110° C. at about atmospheric pressure. Although atmospheric pressure is usually employed, the condensation reactions can be effected at either sub- or super-atmospheric pressures, e. g. pressures between about 5 and about 50 p. s. i. absolute. The reaction period which will be selected is related to the other reaction variables such as temperature and catalyst concentration, but is ordinarily selected between about 1 and about 20 hours. Ordinarily, reaction periods between about 5 and 10 hours are employed when reaction is effected at atmospheric pressure and temperatures of about 100 to 110° C.

The weight ratio of catalyst to aromatic hydrocarbon feed stock is selected between about 0.5 and about 10, for example between about 1 and about 6, the ratio being calculated upon catalyst of 100 percent concentration; usually the catalyst:aromatic hydrocarbon weight ratio is selected between about 1 or 2 and 4. The formic acid catalyst-solvent is employed in concentrations between about 70 and 100 weight percent, the remainder being water, although it is preferred to employ formic acid in a concentration between about 85 and about 100 weight percent, for example 90 weight percent. More rapid reaction and the formation of products having higher softening points result from the employment of concentrated formic acid as distinguished from formic acid having the azeotropic concentration (77.5 weight percent in water) or less, as will be apparent from the specific examples of the invention hereinafter set forth.

Spent formic acid catalyst may be regenerated by distillation to separate the formic acid-water azeotrope, which may then be further concentrated. Thus, a mixture of 207 g. of formic acid with 93 g. water was mixed with 200 g. anhydrous $CuSO_4$, refluxed 4 hours and allowed to stand 24 hours at room temperature. Formic acid was distilled from the resultant mixture under a pressure of 30-40 mm. of mercury. There were recovered 173 g. of acid having a concentration of 86 weight percent formic acid and 17 g. of acid having a concentration of 58 weight percent formic acid. The initial formic acid concentration in the mixture was 69 weight percent. The hydrated $CuSO_4$ can be dehydrated by known methods and recovered for reuse in the dehydration of aqueous formic acid.

The molar ratio of formaldehyde to aromatic hydrocarbon feed stock is selected between about 0.5 and about 2, although about 1 is preferred. Formaldehyde may be used as a gas or in the from of a polymer such as paraformaldehyde which is capable of yielding monomeric formaldehyde under the reaction conditions. The use of formalin is not advisable because of the high concentration of water therein.

Various co-reactants may be employed in the reaction of formaldehyde with aromatic hydrocarbons in order to produce modified condensation products. Examples of co-reactants are phenol, alkylphenols such as cresols, xylenols, o-t-butylphenol, p-t-butylphenol; maleic anhydride; or reactive nitrogen compounds, such as p-toluenesulfonamide and the like. The condensation products may be neutralized by conventional techniques and hydrocarbon solvents, for example, benzene, associated therewith may be distilled. If desired, the condensation products can be subjected to vacuum or molecular distillation. If desired, the condensation products may be subjected to mild catalytic hydrogenation treatment to effect partial saturation thereof and/or to effect some color improvement. For specialized purposes which justify the cost, a solution of the condensation product in a solvent such as benzene may be decolorized by contact with or percolation through an acid-activated clay, yielding a nearly water-white resin in some cases. In addition, it will be obvious that the condensation products can be subjected to specific chemical conversions, for example, chlorination, in order to produce specific products for certain uses.

In order more fully to illustrate the process of the present invention, certain specific examples are tabulated hereinafter. The runs presented in Table 1 were made in a stirred reaction vessel at reflux temperatures, i. e. between about 100 and 110° C. at atmospheric pressure. The feed stock was a hydroformer bottoms fraction boiling between 240° C. and 290° C. except in Runs 1 and 3, in which the boiling range was 245 to 290° C. The feed stock was distilled through a Claisen distillation head, but was otherwise untreated before reaction. The molar ratio of formaldehyde to the aromatic hydrocarbon charging stock was about one. Upon completion of the reaction, stirring was discontinued and the reaction mixture was allowed to cool to about room temperature. The reaction mixture consisted of two liquid layers, viz., a lower layer comprising predominantly formic acid and unreacted formaldehyde and a supernatant layer comprising predominantly the condensation products. In some cases, a solid resinous layer is formed. The layers were separated and the condensation products layer was subjected to distillation to strip off unconverted hydrocarbon or relatively low molecular weight materials by heating to a maximum pot temperature of 220° C. under a pressure of 10 mm. of mercury and discontinuing the distillation after 15 minutes under the last-mentioned conditions.

TABLE 1

*Hydroformer bottoms-formaldehyde condensation reactions (temp., 100–110° C.)*

| Run | Charge, g. | Para. g.[1] | Formic Acid | | | Time/ hrs. | Yield of Resin[4] | Unreacted[4] | Recovered Formic Acid, weight Per Cent[5] | Molecular weight | Color[6] | Ring and Ball Softening Point, °C.[7] |
| | | | Conc., weight Per Cent | Weight, g.[2] | Weight Ratio to Charge | | | | | | | |
|---|---|---|---|---|---|---|---|---|---|---|---|---|
| 1 | 200 | 40 | | (³) | | 7 | No reaction | 100 | | 313 | 9 | 58 |
| 2 | 200 | 40 | 90 | 214 | 1.07 | 2 | 75.5–78 | 26.0 | 93 | 310 | 8.5 | 58 |
| 3 | 200 | 40 | 90 | 271 | 1.36 | 4 | 82.0 | | 87 | 313 | 8 | 62 |
| 4 | 200 | 40 | 90 | 180 | 0.9 | 6 | 87.5 | 17.5 | 90.5 | 314 | 8 | 62 |
| 5 | 200 | 40 | 90 | 214 | 1.07 | 6 | 96.0 | 7.5 | 93.5 | 352 | 9 | 74 |
| 6 | 100 | 20 | 90 | 270 | 2.7 | 6 | 91.0 | 6.0 | 88.5 | 368 | 9 | 61 |
| 7 | 200 | 40 | 90 | 214 | 1.07 | 12 | 44.5 | 8.3 | | 291 | 9 | 49 |
| 8 | 200 | 40 | 77.5 | 214 | 1.07 | 2 | 60.0 | 57.5 | 104 | 291 | 8 | 54 |
| 9 | 200 | 40 | 77.5 | 180 | 0.9 | 6 | 55.6 | 40 | 94.5 | 320 | 8.5 | 49 |
| 10 | 200 | 40 | 77.5 | 214 | 1.07 | 6 | 75.0 | 38.8 | 96.0 | 297 | 8 | 49 |
| 11 | 200 | 40 | 77.5 | 214 | 1.07 | 12 | 74 | 25.0 | | 310 | 10 | 57 |
| 12 | 100 | 20 | 77.5 | 400 | 4.0 | 6 | 85 | | | 310 | 12 | 60 |
| 13 | 100 | 20 | 77.5 | 600 | 6.0 | 6 | | | | | | |

[1] Flake paraformaldehyde.
[2] Calculated as 100% formic acid.
[3] Acetic acid—120 ml.
[4] Weight per cent on hydrobottoms charged.
[5] Based on formic acid charged.
[6] Gardner color (1933 standards) of the resin (undiluted) in Gardner color tube.
[7] ASTM method D36-26.

In Run 1 glacial acetic acid alone was employed. While the acetic acid functioned as a solvent for the charging stocks, it exerted no catalytic effect, since no reaction was found to occur at the reflux temperature (about 118° C.), and no resin product was found to be present when the reaction products were worked up.

An inspection of Runs 2 to 5, inclusive, indicates that the trend upon increasing the reaction period in the range of 2 to 6 hours under otherwise relatively constant operating conditions, employing 90 weight percent formic acid as the catalyst and reaction medium, is to increase the yield, molecular weight and softening point of the product somewhat.

A comparison of Run 6 with 5 indicates that increasing the catalyst:charge ratio from about 1 to about 2.7 under otherwise constant operating conditions increased the resin yield and especially the molecular weight and softening point of the products.

A comparison of Run 7 with 6 indicates that long reaction periods can lead to high resin yields at relatively low catalyst concentrations but that the products formed will have a relatively low softening point as compared to that of a product formed at higher catalyst concentrations.

Runs 8 to 13, inclusive, were performed employing the formic acid-water azeotrope as catalyst-solvent. Increasing catalyst concentrations and reaction periods were found, in general, to increase the yields of product but molecular weights and softening points did not definitely follow a corresponding upward trend. Relatively darker products were produced at high catalyst:charge ratio (Runs 12 and 13). It will also be noted that the use of 90 percent formic acid in general tended to produce products of higher softening points than those derived from operations with 77.5 percent formic acid. In this connection, we have produced a resin having a softening point of 98° C., a Gardner color of 11 and molecular weight of 443 in 76 percent yield by refluxing a mixture of 350 g. of 98 percent formic acid, 20 g. of paraformaldehyde and 100 g. of an acid-treated 240–270° C. fraction of hydroformer bottoms for 3¼ hours at 100–105° C.

The runs presented in Table 2 illustrate the catalytic capacity of concentrated formic acid upon continued re-use. Runs 14 to 18, inclusive, were made in series, the acid layer derived from one run being used as the catalyst-solvent in the succeeding run. Operations were conducted as in previous runs, the reaction period being 6 hours in each run, the initial formic acid concentration being 90 weight percent and the weight ratio of formic acid, calculated as pure formic acid, to hydroformer bottoms being 4.5.

TABLE 2

| Run | Yield | Color | Mol. Weight | Softening Point |
|---|---|---|---|---|
| 14 | 83 | 11 | 349 | 79 |
| 15 | 84 | 11 | 349 | 76 |
| 16 | 90 | 11 | 344 | 76 |
| 17 | 94 | 11 | 347 | 67.5 |
| 18 | 92 | 11 | 333 | 63 |

Excluding Run 18, the resins obtained have similar properties. By Run 18 the water resulting from the reaction had diluted the formic acid to such an extent that resins with lower softening points resulted. The results indicate that the same charge of acid can be used 4 or 5 times before it becomes necessary to recover and concentrate the used acid.

We have also demonstrated that the reaction proceeds smoothly under reflux conditions without requiring mechanical agitation. Thus, a mixture consisting of 100 g. of hydroformer bottoms, 450 g. of 90% formic acid and 20 g. of paraformaldehyde was refluxed at atmospheric pressure (approximately 760 mm.) for 6 hours, without mechanical stirring. As resin was recovered from this reaction in 98.5 weight percent yield, based on the weight of hydroformer bottoms charged, and was found to have the following properties: 11 Gardner color, 375 molecular weight, and 74° C. softening point.

The following example describes the use of a mixture of chloroacetic acid and formic acid as catalyst.

RUN 19

A mixture of 100 g. of hydroformer bottoms (240–290° C. boiling range), 350 g. of 90 percent formic acid, 50 g. of monochloroacetic acid and 20 g. of flake paraformaldehyde was refluxed for 3 hours at 100–110° C. and atmospheric pressure and a resin was recovered, employing the procedure of previous runs, in the yield of 70 weight percent based upon the weight of hydroformer bottoms charged. The resin had a Gardner color of 12, softening point of 71° C. and molecular weight of 313.

Run 20 relates to a joint reaction of hydroformer bottoms and phenol with formaldehyde.

RUN 20

A mixture of 100 grams of hydroformer bottoms (240–290° C. boiling range), 300 grams of 90 percent formic acid and 30 grams of flake paraformaldehyde was refluxed and stirred for 3 hours. Phenol (50 g.) was then added together with 15 g. of paraformaldehyde and the reaction mixture was stirred for an additional 50 minutes. At the end of this time, a hard, light brown solid resin had formed which was found to be completely insoluble at room temperature in the common organic solvents.

The following run describers the reaction of 2-methylnaphthalene and formaldehyde. Crude 2-methylnaphthalene containing sulfur compounds was treated with concentrated sulfuric acid in the amount of 20 pounds per barrel and clay in the proportion of 50 barrels per ton and the resultant purified 2-methylnaphthalene was condensed with formaldehyde as follows.

RUN 21

A mixture of 200 g. of 2-methylnaphthalene, 300 g. of 90 percent formic acid and 40 g. of paraformaldehyde was refluxed with stirring for 6 hours and the product was worked up as in previous runs. The resin yield was 84.5 weight percent, based on the weight of the 2-methylnaphthalene charged. A very light colored resin having a Gardner color of only 6, molecular weight of 297 and softening point of 64.5° C. was thus obtained. When condensation was attempted with an untreated 2-methylnaphthalene sample, emulsion difficulties were encountered and a very dark resin was produced.

RUN 22

Paraformaldehyde (20 g.) was dissolved in 450 g. of boiling 90 weight percent formic acid. One hundred grams of hydroformer bottoms (boiling range 240–290° C.) were then added quickly and the mixture was heated to the reflux temperature. Acetic anhydride was added to the refluxing mixture drop-wise over a period of one-half hour to a total of 60 ml. The resultant mixture was refluxed for an elapsed time of 3 hours. The acid layer was removed and the reaction mixture worked up as usual. The yield of resin was 90 weight percent based on the hydroformer bottoms charged, unreacted hydrocarbons were 4 weight percent on the hydroformer bottoms charge and the concentration of the spent acid layer was 86 weight percent. The resin had a Gardner color of 11, molecular weight of 400 and softening point of 87° C. It will be noted that in this run the reaction period was only 3 hours as compared to the 6 hour reaction period most commonly used. Moreover, the softening point of the resin was higher than was usually obtained in the absence of acetic anhydride. Although it might be thought that the promoting effect of acetic anhydride is due simply to its combination with water produced by the condensation reaction, it seems likely that this is not the correct explanation, for in a similar reaction employing 100 grams of hydroformer bottoms and 20 grams of paraformaldehyde but an increased quantity (102 grams) of acetic anhydride, the resin yield was 80 weight percent and the softening point also was 87° C.

Runs 23, 24 and 25 were reactions of xylenes with formaldehyde in the presence of concentrated formic acid.

RUN 23

A mixture of 212 g. of p-xylene, 425 g. of 90 percent formic acid and 67 g. of paraformaldehyde was refluxed with stirring for 7 hours. Stirring was then discontinued and the reaction mixture was allowed to cool to room temperature. Formic acid was separated from the reaction mixture by decantation in a separatory funnel and the product layer was then distilled through a Claisen head. There were obtained 146 g. (69.5%) of unreacted xylene and 47 g. (22%) of material boiling between 78° C. and 250° C. under the pressure of 100 mm. of mercury. The product was practically water-white, having a Gardner color less than 1, a molecular weight of 206, $n_D^{25}$ 1.5392, and sp. gr. (4/25) 0.9882. From the molecular weight alone it appears that the high boiling product comprises principally bis-(p-xylyl-)methane, which has the molecular weight of 224.

RUN 24

This run was similar to Run 23 except that m-xylene was charged. A mixture of 212 g. of m-xylene (96.5 weight percent pure), 250 g. of 90 percent formic acid and 67 g. of paraformaldehyde was refluxed for 6 hours after which the material was distilled under vacuum through a Claisen head. The following fractions were obtained.

| Fraction | B. R., °C. | P. mm. | g. | Weight per cent on m-xylene |
|---|---|---|---|---|
| 1 | 124–202 | 100 | 60 | 28.3 |
| 2 | 202–240 | 5 | 23 | 10.8 |
| bottoms | | 5 | 145 | 68.5 |

The fractions and residue are characterized by the following constants:

| Fraction | Mol. Weight | Gardner Color | $n_D^{25}$ |
|---|---|---|---|
| 1 | 221 | 1 | 1.5633 |
| 2 | 252 | 1 | 1.5704 |
| bottoms | 395 | 3 | |

From the data in Runs 23 and 24, it is apparent that m-xylene reacts more readily than p-xylene. The infrared spectra of the bottoms material showed the presence of aldehyde and ether groups. Hydroxyl groups and carboxyl groups were absent.

RUN 25

A mixture of 212 g. of xylenes (48.6 weight percent para, 46.3 weight percent meta and 4.7 weight percent ortho), 300 g. of 90 percent formic acid and 67 g. of paraformaldehyde was stirred and refluxed at 100–110° C. for 6 hours, the formic acid layer separated from the condensation products by decantation and the condensation products worked up by distillation. It was found that 33 percent of the xylenes had not reacted and that the yield of condensation products was 48 weight percent based on xylenes charged. Ultraviolet spectral analysis of the unreacted xylenes indicated that the mixture had the following composition:

87–90 weight percent p-xylene
5–7 weight percent m-xylene
1–4 weight percent o-xylene.

It is obvious from the foregoing that the meta-xylene component of the charging stock had reacted selectively and to a very high degree with formaldehyde under the conditions of this run. The p-xylene can be readily recovered from the unreacted xylenes by fractional freezing, using the techniques well known in the art. It will be apparent that the application of the present process to xylene mixtures containing p-xylene can lead to the production of very pure p-xylene for special uses, for example for oxidation to terephthalic acid which can be condensed with ethylene glycol and the like to produce synthetic resins especially adapted for the manufacture of fibers.

Various of the condensation products produced by the process of the present invention are adaptable for use as varnish resins, as rubber compounding ingredients, as resinous materials suitable in floor tile compounding, as an electrical insulating medium, as raw materials for chlorination to produce insecticides, as resin extenders with polyvinylchloride plastics, etc.

Having thus described our invention, what we claim is:

1. A process which comprises contacting an aromatic hydrocarbon having at least one unsubstituted nuclear carbon atom and formaldehyde with a catalyst consisting essentially of formic acid at a temperature between about 10° C. and about 130° C. and separating an organic chemical condensation product thus produced.

2. A process which comprises contacting an aromatic hydrocarbon having at least one unsubstituted nuclear carbon atom and formaldehyde with a catalyst consisting essentially of formic acid having a concentration of at least about 70 percent by weight at a temperature between about 10° C. and about 130° C. and separating an organic chemical condensation product thus produced.

3. A process which comprises contacting a methyl-substituted aromatic hydrocarbon having at least one unsubstituted nuclear carbon atom in the molecule and boiling between about 110° C. and about 300° C. with formaldehyde and a catalyst consisting essentially of formic acid having a concentration of at least about 70 percent by weight at a temperature between about 10° C. and about 130° C. and separating an organic chemical condensation product thus produced.

4. A process which comprises contacting a methylnaphthalene having at least two unsubstituted nuclear carbon atoms in the molecule with formaldehyde and a catalyst consisting essentially of formic acid having a concentration of at least about 70 percent by weight at a temperature between about 50° C. and about 110° C. and separating an organic chemical condensation product thus produced.

5. A process which comprises contacting a hydrocarbon fraction containing a substantial proportion of a dimethylnaphthalene with formaldehyde and about ½ to about 10 parts by weight of formic acid having a concentration of at least about 70 percent by weight, per part by weight of said dimethylnaphthalene, at a temperature between about 90° C. and about 120° C. under pressure sufficient to maintain the liquid phase and separating an organic chemical condensation product thus produced.

6. A process which comprises contacting a xylene and formaldehyde with a catalyst consisting essentially of formic acid having a concentration of at least about 70 percent by weight at a temperature between about 90° C. and about 120° C. and separating an organic chemical condensation product thus produced.

7. A process which comprises contacting a hydrocarbon fraction containing a plurality of isomeric xylenes and formaldehyde with a catalyst consisting essentially of formic acid having a concentration of at least about 70 percent by weight at a temperature between about 90° C. and about 120° C. and separating an organic chemical condensation product thus produced.

8. A process which comprises contacting formaldehyde and a hydrocarbon fraction boiling in the range of about 240° C. to about 290° C. and containing a substantial proportion of dimethylnaphthalenes with formic acid having a concentration of at least about 77 percent by weight, the amount of formic acid being between about 1 and about 6 parts by weight per part by weight of said hydrocarbon fraction, at a temperature between about 100° C. and about 110° C. under pressure sufficient to maintain the liquid phase, and separating a resinous organic chemical condensation product thus produced.

9. The process of claim 8 wherein phenol is added as a co-reactant.

10. The process of claim 8 wherein acetic anhydride is added as a promoter.

11. A process which comprises contacting formaldehyde and a mixture of xylenes containing m-xylene and at least one other xylene with a catalyst consisting essentially of formic acid having a concentration of at least about 70 percent by weight, at a temperature between about 90° C. and about 120° C., thereby effecting a selective chemical condensation reaction between said m-xylene and said formaldehyde, and separating an organic chemical condensation product thus produced.

12. A process which comprises contacting formaldehyde and a mixture of xylenes comprising essentially m-xylene and p-xylene with a catalyst consisting essentially of formic acid having a concentration of at least about 70 percent by weight, at a temperature between about 90° C. and about 120° C., thereby effecting a selective chemical condensation reaction between said m-xylene and said formaldehyde, and separating an organic chemical condensation product thus produced.

PAUL D. MAY.
ROBERT J. LEE.

REFERENCES CITED

The following references are of record in the file of this patent:

UNITED STATES PATENTS

| Number | Name | Date |
| --- | --- | --- |
| 2,142,076 | Rust | Dec. 27, 1938 |
| 2,302,403 | Tetley | Nov. 17, 1942 |
| 2,439,228 | Sturrock et al. | Apr. 6, 1948 |